(12) United States Patent
DeCegama

(10) Patent No.: US 8,068,683 B2
(45) Date of Patent: Nov. 29, 2011

(54) VIDEO/AUDIO TRANSMISSION AND DISPLAY

(75) Inventor: Angel DeCegama, Westford, MA (US)

(73) Assignee: AMOF Advance Limited Liability Company, Dover, DE (US)

( * ) Notice: Subject to any disclaimer, the term of this patent is extended or adjusted under 35 U.S.C. 154(b) by 73 days.

(21) Appl. No.: 12/615,927

(22) Filed: Nov. 10, 2009

(65) Prior Publication Data

US 2010/0054701 A1    Mar. 4, 2010

Related U.S. Application Data

(63) Continuation of application No. 11/133,072, filed on May 18, 2005, now Pat. No. 7,630,569, which is a continuation-in-part of application No. 10/374,824, filed on Feb. 25, 2003, now Pat. No. 7,317,840.

(60) Provisional application No. 60/572,250, filed on May 18, 2004, provisional application No. 60/360,184, filed on Feb. 26, 2002.

(51) Int. Cl.
*G06K 9/36* (2006.01)
*G06K 9/46* (2006.01)

(52) U.S. Cl. ...................................................... 382/240

(58) Field of Classification Search .............. 382/162, 382/164, 168, 232, 233, 240, 248, 251, 254, 382/260–264, 276; 375/240.02, 240.04, 375/240.11, 240.12, 240.19, 240.26, E7.04, 375/E7.09, 2, E7.261; 348/423.1, 554, 558, 348/569, 700, 701; 386/94, 111, 112, E5.004; 358/1.1, 2.1, 3.27
See application file for complete search history.

(56) References Cited

U.S. PATENT DOCUMENTS

| | | | |
|---|---|---|---|
| 5,497,435 A | 3/1996 | Berger |
| 5,546,477 A | 8/1996 | Knowles et al. |
| 5,692,063 A | 11/1997 | Lee et al. |
| 5,748,786 A | 5/1998 | Zandi et al. |

(Continued)

FOREIGN PATENT DOCUMENTS

WO    99/57908 A    11/1999

OTHER PUBLICATIONS

Office Action, mailed Feb. 28, 2007, for U.S. Appl. No. 10/374,824, 12 pages.

(Continued)

*Primary Examiner* — Amir Alavi
(74) *Attorney, Agent, or Firm* — Schwabe, Williamson & Wyatt, P.C.

(57) ABSTRACT

The invention presents new methods of compression, transmission, and decompression of video signals providing increased speed and image quality and for protecting against camcorder piracy. Methods based on selecting an anchor frame, wavelet transformation with decimation and time stamping can provide one-pass encoding of signals in which the amount of bits of information needed to be transmitted can be substantially reduced, thereby increasing the speed of transmission of digital signals over networks. Decompressing signals, along with interpolation methods to re-create portions of images of lesser importance in visual perception, can provide coordinated video and audio presentations of high quality in real-time over all kinds of networks and frame interpolation resulting in a displayed frame rate significantly higher than 30 fps. The use of randomly selected anchor frames can render reconstructed transmitted images of poor quality for pirates who do not have access to identities of anchor frames.

19 Claims, 10 Drawing Sheets

U.S. PATENT DOCUMENTS

| | | | |
|---|---|---|---|
| 5,761,341 | A | 6/1998 | Go |
| 5,901,178 | A | 5/1999 | Lee et al. |
| 5,909,518 | A | 6/1999 | Chui |
| 6,005,980 | A | 12/1999 | Eifrig et al. |
| 6,100,940 | A | 8/2000 | Dieterich |
| 6,137,915 | A | 10/2000 | Chai |
| 6,259,819 | B1* | 7/2001 | Andrew et al. ............... 382/248 |
| 6,272,180 | B1* | 8/2001 | Lei ........................... 375/240.16 |
| 6,289,297 | B1 | 9/2001 | Bahl |
| 6,295,380 | B1 | 9/2001 | Takahashi |
| 6,377,309 | B1 | 4/2002 | Ito et al. |
| 6,434,196 | B1 | 8/2002 | Sethuraman et al. |
| 6,459,814 | B1* | 10/2002 | Li et al. ........................ 382/240 |
| 6,487,247 | B2 | 11/2002 | Sugahara |
| 6,507,673 | B1 | 1/2003 | Wang et al. |
| 6,526,175 | B2 | 2/2003 | Sodagar et al. |
| 6,553,147 | B2 | 4/2003 | Chai et al. |
| 6,574,213 | B1 | 6/2003 | Anadakumar et al. |
| 6,633,608 | B1 | 10/2003 | Miller |
| 6,704,358 | B1 | 3/2004 | Li et al. |
| 6,757,437 | B1 | 6/2004 | Keith et al. |
| 6,782,136 | B1 | 8/2004 | Lerner et al. |
| 6,970,510 | B1 | 11/2005 | Wee et al. |
| 6,993,198 | B2 | 1/2006 | Kishi |
| 7,245,769 | B2* | 7/2007 | Temizel et al. ............... 382/233 |
| 7,283,684 | B1* | 10/2007 | Keenan ......................... 382/276 |
| 7,305,139 | B2* | 12/2007 | Srinivasan et al. ............ 382/248 |
| 7,317,840 | B2 | 1/2008 | DeCegama |
| 7,349,579 | B2* | 3/2008 | Kadowaki et al. ............ 382/240 |
| 7,400,772 | B1* | 7/2008 | Keenan ......................... 382/232 |
| 7,423,781 | B2* | 9/2008 | Morimoto et al. ............. 358/2.1 |
| 7,480,416 | B2* | 1/2009 | Liao et al. ..................... 382/240 |
| 7,630,569 | B2 | 12/2009 | DeCegama |
| 2007/0116373 | A1* | 5/2007 | Hwang et al. ................ 382/261 |
| 2010/0054701 | A1* | 3/2010 | DeCegama ..................... 386/94 |

OTHER PUBLICATIONS

Final Office Action, mailed Jun. 21, 2007, for U.S. Appl. No. 10/374,824, 15 pages.

Notice of Allowability, mailed Aug. 15, 2007, for U.S. Appl. No. 10/374,824, 2 pages.

Notice of Allowability, mailed Aug. 6, 2009, for U.S. Appl. No. 11/133,072, 5 pages.

Office Action, mailed Jan. 1, 2006, for U.S. Appl. No. 11/133,072, 10 pages.

Office Action, mailed Jan. 25, 2008, for AU Patent Application 200321776, 2 pages.

Office Action, mailed Jul. 9, 2009, for KR Patent Application 10-2004-7013400, 6 pages.

Search Report, mailed Oct. 20, 2004, for PCT/US03/05951, 5 pages.

J.M. Shapiro, "Embedded Image Coding Using Zero trees of Wavelet Coefficients," IEEE Transactions of Signal Processing, vol. 41, No. 12, Dec. 1993, 18 pages.

O. Egger, W. Li, "Sub-band Coding of Images Using Asymmetrical Filter Banks," IEEE Transaction on Image Procesxsing, vol. 4, No., Apr. 1995, 8 pages.

Polikar, Robi, "The Wavelet Tutorial, Part I, II, III, IV", http://engineering.rowan.edu/-polikar/wavelets/wtpart1.html; http://engineering.rowan.edu/-polikar/wavelets/wtpart2.html; http://engineering.rowan.edu/-polikar/wavelets/wtpart3.html; http://engineering.rowan.edu/-polikar/wavelets/wtpart4.html, Nov. 16, 2001, 70 pages.

Allowance of Patent, mailed Feb. 10, 2010, for Korean Patent Application 7013400/2004.

N. C. Nguyen, "A Note on Tikhonov Regularization of Linear Ill-Posed Problems," Massachusetts Institute of Technology, Oct. 3, 2006, pp. 1-4.

"Tikhonov Regulation," from Wikipedia, the free encyclopedia http://en.wikipedia.org/wiki/Tikhonov_regularization, obtained on May 5, 2011, 5 pages.

Albert Cohen et al., "Wavelets: The Mathematical Background," Special Issue on Wavelets, Proceeding of the IEEE, vol. 84, No. 4, Apr. 1996, pp. 514-522.

Philippe Guillemain et al., "Characterization of Acoustic Signals Through Continuous Linear Time-Frequency Representations," Special Issue on Wavelets, Proceeding of the IEEE, vol. 84, No. 4, Apr. 1996, pp. 561-585.

Nikolaj Hess-Nielsen et al., "Wavelets and Time-Frequency Analysis," Special Issue on Wavelets, Proceeding of the IEEE, vol. 84, No. 4, Apr. 1996, pp. 523-540.

Stephane Mallat, "Wavelets for a Vision," Special Issue on Wavelets, Proceeding of the IEEE, vol. 84, No. 4, Apr. 1996, pp. 604-614.

Kannan Ramchandran et al., "Wavelets, Subband Coding, and Best Bases," Special Issue on Wavelets, Proceeding of the IEEE, vol. 84, No. 4, Apr. 1996, pp. 541-560.

Peter Schroder, "Wavelets in Computer Graphics," Special Issue on Wavelets, Proceeding of the IEEE, vol. 84, No. 4, Apr. 1996, pp. 1-11.

Gregory W. Wornell, "Emerging Applications of Multirate Signal Processing and Wavelets in Digital Communications," Special Issue on Wavelets, Proceeding of the IEEE, vol. 84, No. 4, Apr. 1996, pp. 586-603.

I. Daubechies, "Ten Lectures on Wavelets," Society for Industrial and Applied Mathematics, Philadelphia, 1992, 343 pages.

Ian H. Witten et al., "Arithmetic Coding for Data Compression," Communications of the ACM, vol. 30, No. 6, Jun. 1987, pp. 520-540.

Jacques Vaisey, "Subband Prediction Using Leakage Information in Image Coding," IEEE Transactions on Communications, vol. 43, No. 2/04, Part 01, Feb. 1995, pp. 216-221.

J.M. Bruneau et al., "Image Restoration Using Biorthogonal Wavelet Transform," Visual Communications and Image Processing '90, Lausanne, Switzarland, Proceeding of the SPIE, vol. 1360, 1990, pp. 1404-1415.

Eiji Atsumi et al., "Image Data Compression with a Selective Preservation of Wavelet Coefficients," Visual Communications and Image Processing '95, Taipei, Taiwan, Proceedings of the SPIE, vol. 2501, 1995, pp. 545-554.

Nobutaka Kuroki et al., "Haar Wavelet Transform with Interband Prediction and Its Application to Image Coding," Electronics and Communications in Japan, Part III—Fundamental Electronic Science, vol. 78, No. 4, Apr. 1995, pp. 103-114.

Gavin B. Horn et al., "A Scalable and Reliable Paradigm for Media on Demand," IEEE Computer, Sep. 2001, pp. 40-45.

* cited by examiner

```
>>  b = [0 0 0 0 0.125 -0.375 0.375 -0.125 0 0 0 0];
>>  aa = [0 0 0 0 0.125 0.375 0.375 0.125 0 0 0 0];

>>  a = [-0.009765625 0.29296875 0.037109375 -0.189453125];
>>  a = [a -0.05078125 0.68359375 0.68359375 -0.05078125];
>>  a = [a -0.189453125 0.037109375 0.029296875 -0.009765625];
>>  bb = [0.009765625 0.029296875 -0.037109375 -0.189453125];
>>  bb = [bb 0.05078125 0.68359375 -0.68359375 -0.05078125];
>>  bb = [bb 0.189453125 0.037109375 -0.029296875 -0.009765625];
>>  aa = 2.0*aa;
>>  bb = 2.0*bb;
>>  H = zeros (16,32);
>>  G = zeros (16,32);
>>  H2 = zeros (32,16);
>>  G2 = zeros (32,16);
>>  N = 12;
>>  for i=1: length (d) / 2
for k = 1:N
j = 2 * i - 1 -(N - k);
if j < 1
j = length (d) + j;
end
H (i,j) = a (k);
end
end
>>  for i = 1: length (d) / 2
for k = 1:N
j = 2 * i - 1 - (N - k);
if j < 1
j = length (d) + j;
end
G (i, j) = b (k);
end
end
```

FIG. 8

```
>>   i = 1;
>>   j = 1;
>>   while i < = length (d)
j x = j;
for k = 1 : 2 : N
H2 (i, j x) = aa (k);
j x = j x + 1;
if j x > length (d) / 2
j x = j x - length (d) / 2;
end
end
i = i + 1;
j = j + 1;
j x = j - 1;
for k = 2 : 2 : N
j x = j x + 1;
if j x > length (d) / 2
j x = j x - length (d) / 2;
end
H2 (i, j x) = aa (k);
end
i = i + 1;
end
>>   i = 1;
>>   j = 1;
>>   while i < = length (d)
j x = j;
for k = 1 : 2 : N
G2 (i, j x) = bb (k);
j x = j x + 1;
if j x > length (d) / 2
j x = j x -length (d) / 2;
end
end
```

FIG. 8 (continued)

```
i = i + 1;
j = j + 1;
j x = j - 1;
for k = 2 : 2 : N
j x = j x + 1;
if j x > length (d) / 2
j x = j x - length (d) / 2;
end
G2 (i, j x) = bb(k);
end
i = i + 1;
end
>>      K = G2 ' * H ' *G*G2;
>>      L = G2 ' * H' *H*G2;
>>      I1 = zeros (length (d) / 2, length (d) / 2);
>>      for i = 1 : length (d) / 2
I1 (i, i) = 1;
end
>>      alph = 1.0;
>>      I = alph * I1;
>>      M = inv (I + L);
>>      N = G2*M*K;
>>      T = H2 + N;
```

FIG. 8 (continued)

VIDEO/AUDIO TRANSMISSION AND DISPLAY

CLAIM OF PRIORITY

This application is a Continuation Application of U.S. application Ser. No. 11/133,072, filed May 18, 2005, now U.S. Pat. No. 7,630,569 entitled Real Software Video/Audio Transmission and Display with Content, Protection against Camcorder Piracy which is a Continuation-In-Part of U.S. application Ser. No. 10/374,824, entitled Methods for Real-Time Software Video/Audio Compression, Transmission, Decompression and Display; filed Feb. 25, 2003, now issued as U.S. Pat. No. 7,317,840 on Jan. 8, 2008, which claims priority to U.S. Provisional Patent Application No: 60/360, 184; entitled Methods For Real-Time Software Video/Audio Compression, Transmission, Decompression and Display; filed Feb. 26, 2002 now expired. The Ser. No. 11/133,072 application also claims priority to U.S. Provisional Patent Application No: 60/572,250; entitled Real-Time Software Video/Audio Transmission and Display with Content Protection Against Camcorder Piracy; filed May 18, 2004. All of the above applications are incorporated herein fully by reference.

FIELD OF THE INVENTION

This invention relates to methods and software programs for compressing, transmitting, decompressing and displaying information. Specifically, this invention relates to compression, transmitting, decompressing and displaying video and audio information over all kinds of networks with protection against camcorder piracy.

BACKGROUND

Current state-of-the-art technology cannot deliver quality video in real-time at a reasonable cost over the Internet. There is a fundamental reason for this situation; the methods use algorithms that cannot compress the video and the audio signals to the levels required for economical transmission bandwidth consumption without destroying the quality of the decompressed signals at the receiving end. Quality that is not comparable to cable TV is not acceptable. There is only limited market demand for it.

Current methods do not provide sufficient speed necessary to provide desirable and economical levels of compression. The video currently available on the Internet consists of short sequences that must be downloaded first before being played back. The amount of data involved in video signals is so large that software implementations of current algorithms cannot process them in real-time.

Prior art attempts to provide rapid, high-quality video/audio compression have met with limited success.

U.S. Pat. No. 5,761,341 discloses a method of image compression based on the Wavelet Transformation of the given image using both low frequency and high frequency coefficients in the decompression process. No mention is made of any method to recover the image directly from the low frequency WT coefficients alone which is one of the innovations of this invention.

The paper, "Image Data Compression with Selective Preservation of Wavelet Coefficients," Atsumi Eiji et. al, Visual Communications and Image Processing '95, Taipei, Taiwan, Proceedings of the PIE, Vol. 2501. 1995 describes a method for image compression that is also based on the Wavelet Transform. The main thrust of the paper is in two techniques for deciding which high frequency coefficients to keep to achieve optimum quality for a given level of compression for the decompressed image. No mention is made about what to do when no high frequency coefficients are available.

The paper, "Haar Wavelet Transform with Interband Prediction and its Application to Image Coding," Kukomi N. et al, Electronics and Communications in Japan, Part III—Fundamental Electronic Science, Vol. 78, No. 4, April 1995, herein incorporated fully by reference, describes another method for image compression that uses the Haar wavelet as the basis for the Wavelet Transform. The Haar wavelet is used because of the simple functional forms used to obtain the low and high frequency WT coefficients, i.e., the sum and the difference divided by 2 of two consecutive pixels. Because of these simple relationships, it is postulated that the high frequency coefficients and the first order derivative of the low frequency coefficients are linearly related with a proportionality variable $\alpha$. Using this linear function to predict the high frequency coefficients from the low frequency coefficients, the error between the actual and predicted high frequency coefficient values can be obtained and the value of $\alpha$ used is the one that minimizes the mean squared error. Thus, instead of encoding the low and the high frequency coefficients, the method consists of encoding the low frequency coefficients and the error between the predicted and the actual high frequency coefficients which presumably reduces the bit rate somehow. This method cannot work for any other type of wavelet and is therefore of limited value.

The paper, "Sub-band Prediction using Leakage Information in Image Coding," Vaisey, IEEE Transactions on Communications, Vol 43, No. 2/04, Part 01, February 1995, incorporated herein fully by reference, describes a method for image sub-band coding that attempts to predict the high-pass bands from the low-pass bands and then encodes the error between the predicted and actual high-pass bands which requires fewer bits than encoding the actual high-pass bands. The prediction is done by examining a 3×3 neighborhood around each pixel in a given low frequency band and classifying it into one of 17 groups. The result of the classification is then used to choose a family of 9 high frequency coefficient predictors that depend on the appropriate high-pass band. This method suffers from the basic shortcoming of all vector quantization methods: it is not general enough and thus, cannot provide the flexibility necessary to provide rapid, high-quality compression and decompression that can adapt to the wide variety of images characteristic of current video productions.

The paper, "Image Restoration using Biorthogonal Wavelet Transform," Bruneau, J. M. et al, Visual Communications and Image Processing '90, Lausanne, Switzerland, Proceedings of the SPIE, Vol. 1360, 1990, herein incorporated fully by reference, discloses a method of image restoration based on the non-decimated biorthogonal Wavelet Transform. The only thing in common between this paper and the description of the invention is the basic wavelet theory math used and a few similarities in some of the notation, which is not surprising since the notation used on most papers discussing wavelets is the one introduced by their inventor, I. Daubechies (see, for example, "Ten Lectures on Wavelets," I. Daubechies, Society for Industrial and Applied Mathematics, Philadelphia, 1992.), herein incorporated fully by reference. The method presented in the paper can only be used for deblurring images that have been exposed to a blur operator consisting of the scaling function of a biorthogonal wavelet set not a likely practical situation in the real world. It cannot be used for compression or expansion which are the main applications of the invention.

Another problem with the methods of this paper is that its computational complexity is high. In order to apply this method for image restoration (or enhancement) large matrices must be calculated (640×480 for an image of this number of pixels) and repeatedly multiplied by all the rows and columns of the image to obtain an enhanced version of it. But, because such a matrix is calculated from a number of ill-conditioned matrices and regularizing techniques must be applied, it is only an initial estimate. To obtain the best possible enhanced image, an iterative procedure, such as the conjugate gradient algorithm, is applied. For these reasons, the method proposed in this paper is impractical even for the expressed purpose of image restoration.

More recently, U.S. application Ser. No. 10/374,824 discloses methods for real-time transmission of high quality digital video and audio signals over networks. This application discloses methods for capturing an image, decimating the image, using, for example, wavelet transformation, time-stamping the image, transmitting a decimated image, decompressing, interpolating and displaying the signal. Decimating the image reduces the number of bits of information that need to be transmitted, thereby increasing speed of transmitting video data over a network. Decompression and interpolation of transmitted information permits re-construction of images that of high quality, which in some cases, may not be distinguishable by eye from the original, unprocessed image. Coordination of audio signals with decompressed interpolated images permits real-time transmission of video and audio signals to create a high-fidelity display.

However, currently available methods do not provide sufficient protection from unauthorized interception and use by camcorders.

SUMMARY OF THE INVENTION

Thus, an object of this invention is to provide rapid compression and decompression so that transmission of video and audio signals can be presented rapidly to a viewer.

Another object of this invention is to provide improved methods for encoding and decoding video signals using wavelet transforms.

A further object of this invention is to provide methods for reconstructing video images after transmission.

This invention, that has been demonstrated, includes methods that result in network bandwidth requirements well within the mid-range of existing DSL modems (and consequently in acceptable cost to the users) and a quality of the full-screen full-motion decompressed video/audio at least comparable to that of Cable TV systems.

Aspects of the invention incorporating novel algorithms that can be implemented in software are also fast and effective so that data compression and decompression can take place in real-time. Software of this invention can run on 1 GHz processors which are currently very common, and can produce full-screen, full-motion decompressed quality video in real-time. This can be accomplished using an amount of compressed data per second that is less than ½ of that produced by state-of-the-art methods using algorithms, such as MPEG, which does not provide the quality of decompressed video of this invention.

The methods of this invention using novel algorithms can also be easily implemented in hardware for TV set top boxes, for example, to avoid the need for a PC to run the software.

This invention includes a number of innovative techniques that can result in the capability to compress video/audio to a level that requires a fraction of the transmission bandwidth of current techniques such as MPEG, while being able to recreate with very high quality of the original input and even enlarge it while maintaining such quality. The processing can be done by software only, can take place in real-time, and can produce full screen full motion video comparable to Cable TV but requiring just a simple DSL or wireless modem to connect to the Internet or other networks. No other video/audio compression/decompression system to date can do this.

Aspects of this invention are based on the understanding that visual perception relies more extensively on low frequency components of a signal than on the high-frequency components. Low frequency components provide information about basic shapes, such as ellipses, circles and the like. High-frequency components provide information about edges and corners.

Embodiments of this invention can include one or more of the following steps: (1) encoding based on asymmetrical filters for decimating information by wavelet transformation; (2) decoding transmitted information obtained by step (1); (3) enlargement of decoded signals; (4) synchronization/interpolation to match audio and video output signals; and (5) enhancement methods for creating an image of quality nearly identical with the original image.

For rapid transmission of digital signals, an encoding process can eliminate certain of the high frequency components and thereby reduce the total number of bits required to transmit the signal. At the receiving end of the system, the low-frequency components are decoded to provide basic information about shapes and locations of objects in the field. Although certain high-frequency components are omitted during transmission, they may be re-created using novel decoding and interpolation methods. Thus, a re-created image comprising encoded/decoded/interpolated low frequency and high frequency components can appear substantially identical to the original image to a viewer.

Moreover, using the decoding and interpolation methods of this invention, video images can be coordinated with audio signals to produce a "seamless" audiovisual presentation in real time over all kinds of networks, without either audio or visual "gaps."

The encoding and decoding steps can advantageously be accomplished using wavelet transformations. After wavelet transformation of an input signal, certain low-frequency signals, which contain much of the information necessary for visual perception can be selected and compressed. Certain high-frequency signals derived from the wavelet transformation can be compressed, and other, less visually relevant high frequency signals can be dropped. Because transmission of the dropped signals can be accomplished using substantially smaller numbers of bits, encoded as zeros, the rate of transmission of an overall transformed and encoded signal can be carried out substantially faster than conventional compressed data. Decoding the signals using inverse wavelet transforms and then coordinating video and audio signals completes the process.

Additionally, in certain embodiments, entire frames can be dropped, reducing the number of bits of information to be processed.

Moreover, after transmission, the signals can be decompressed, and missing information (e.g., high frequency components and missing frames) can be interpolated. The reconstituted video images can be coordinated with decoded audio signals, and the audio and video signals can be combined in proper register to create a fully reconstituted video/audio stream.

By contrast with some of the above-described prior art, the method of the invention for image enlargement does not involve any matrices that change with the size of the signal (one-dimensional or multi-dimensional). It involves just two one-dimensional short filters that are convolved alternatively with the given data to produce two consecutive values out of every given data value for signal reconstruction or expansion. These filters do not depend on the size of the data but on the wavelet used to compress the signal or selected to expand the signal based on such considerations as smoothness and sharpness. The simplicity of the computations makes the method of the invention extremely practical.

This invention also includes embodiments that are very difficult to intercept and decompress accurately. In some of these embodiments, anchor frames are selected randomly so that an unauthorized user, who does not have access to the code used to select anchor frames cannot readily identify them. Thus, without accurate information relating to identification of anchor frames, an unauthorized user will tend to recreate images based on poor information unless a frame-by-frame analysis is conducted. Such analyses are prohibitively expensive and time consuming and will not produce real-time reproduction of transmitted images.

BRIEF DESCRIPTION OF THE FIGURES

This invention will be described with reference to particular embodiments thereof. Other objects, features, and advantages of the invention will become apparent with reference to the specification and drawings in which:

FIG. 8 depicts a Matlab program to obtain expansion filters for a wavelet basis.

DETAILED DESCRIPTION OF THE INVENTION

I. General Description of the Invention

To achieve the goals stated above, and as described in U.S. application Ser. No. 10/374,824 (incorporated herein fully by reference), the present invention discloses that a decimated wavelet transform (WT) can advantageously be used. Decimation can result in a number of low frequency coefficients which is one half of the number of original values to be encoded and an equal number of high frequency coefficients for a total equal to the original number of values. Without decimation, as in some prior art methods, the WT results in a number of high and low frequency coefficients which is double the original number of values. However, according to the present invention, the decimated WT can be used for compression by discarding some, or all, as is certain embodiments of the invention, of the high frequency coefficients. As is another teaching of the present invention, the decimated WT can also be a basis for expansion, because a given signal can be thought of as the set of low frequency coefficients of the decimated WT of a signal twice as long. In the case of images the expansion factor is 4 instead of 2.

Figure 1A:
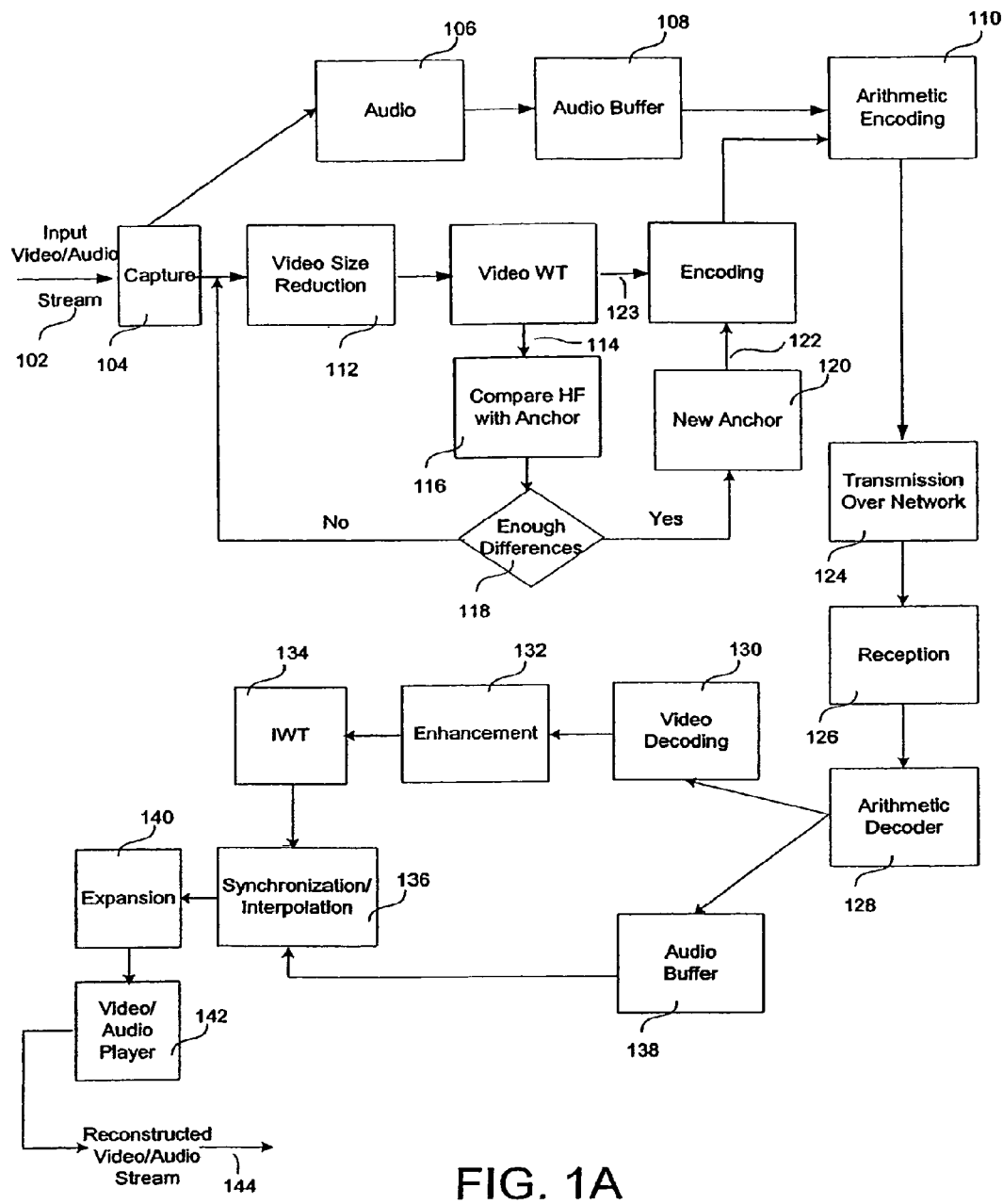
FIG. 1A depicts a schematic diagram of a functional description of an embodiment of this invention.

The functional blocks involved in the compression, transmission and decompression of a video stream are shown in FIG. 1.

By way of example, Video and Audio inputs 102 can be captured separately by capture video and audio boards 104 that are part of the input hardware of a PC or workstation or other compatible system. The video capture board changes the format of color frames from RGB (Red, Green, Blue) to YUV (luminance or intensity and chrominance).

The audio input 106 is broken up into small packets of about 4 KB or less that are buffered in Audio buffer 108, time stamped and processed separately by an Arithmetic Encoder module 110 that compresses such packets losslessly, i.e., perfect reconstruction is assured.

Each frame YUV component can be reduced in size 112, for example, from 640×480 to 320×240 for the Y components and from 320×480 to 160×240 for the U and V components. The new YUV components receive the same time stamp. Size reduction can be accomplished by horizontal and vertical decimation. A purpose of size reduction is to have less data to deal with which helps with compression and speed. However, without the ability to recover the original size with quality, such size reduction would be self-defeating. It will be shown that in certain aspects of this invention, algorithms for image expansion can be capable of expanding images many times over with high quality and no pixelization, which is one of the shortcomings of current state-of-the-art image enlargement techniques.

Subsequently, the next step is the calculation of the Wavelet Transform (WT) 114 of each YUV component according to methods described in a "Special Issue on Wavelets, Proceedings of the IEEE," April 1996, incorporated herein fully by reference. The Wavelet Transform (WT) has been shown to be a much more compact signal representation than the Fourier Transform, thereby providing higher compression. This process is described in greater detail in FIG. 5.

Figure 2:
FIG. 2 depicts a video image before encoding.
Figure 3:
FIG. 3 depicts the video image shown in FIG. 2 after one layer of wavelet transformation of this invention of image rows.
Figure 4:
FIG. 4 depicts the video image shown in FIGS. 1 and 2 after a first level image wavelet transform.

FIGS. 2, 3 and 4 illustrate the WT concept. The WT of an image such as FIG. 2 can be obtained by filtering it with a low-pass filter and a high-pass filter that together represent the basis function (wavelet) used to express the image (function) as a linear combination of scaled versions in space and frequency of the basic wavelet. The filtering operation can be carried out mathematically as a convolution of the filter coefficients and the pixels of the image YUV components.

By applying a low-pass filter to the rows of FIG. 2 with decimation, obtained by advancing the filter along the row two pixels at a time, the left half of FIG. 3 can be obtained. The right half of FIG. 3 can be obtained similarly with the high-pass filter. In the right side of FIG. 3, the high frequency signals of the edges of the image are represented by white and the black areas represent low-value components of the image, which can be ignored.

FIG. 4 is obtained from FIG. 3 by repeating the above process on the columns of FIG. 3 FIG. 4 represents level 1 of the WT of FIG. 2. The upper left corner of FIG. 4 is a lower resolution replica of the original image, containing low-frequency components. The lower left, upper right and lower right portions of FIG. 4 represent high frequency components of the original image. Thus, FIG. 4 represents one complete pass of the image through the WT processing.

By repeating the entire process with such one fourth size image as in the upper left portion of FIG. 4, a second level (2) of the WT of FIG. 2 can be obtained. Repeated application of the process provides additional levels of transformation. For applications to video, starting with, for example, a 320×240

(Y) or 160×240 (UV) frame, 4 levels of transformation can be used, resulting in a low-pass version of the frame components of 20×15 (Y) or 10×15 (UV). The rest of the WT includes edge information of the frame components which, as can be seen from this example, is made up mostly of very small values (black areas) that are not significant for image reconstruction. Thus, it should be clear that, instead of having to encode all the pixel values of the original image, the transformed image includes the coefficients that are important and should be encoded, and omits those coefficients that are not important to visual perception. It should be noted that the choice of wavelet basis has an impact on the overall compression and reconstructed image quality. It can be appreciated that one can use any desired number of iterations of the compression preparation scheme depicted by FIG. 4. The only limitations are in the quality and timing of the creation of the reconstituted image after the entire process of capture, compression, encoding, transmission, decoding, expansion, enhancement, interpolation and reconstruction are accomplished. With repeated iterations of the compression steps, progressively more high-frequency information can be deleted from the transmitted image.

Prior art video compression methods, such as MPEG typically require 15 kilobytes (kbytes) per frame to achieve a video quality that is relatively poor. Using MEPG technology, substantially more kbytes are needed to produce high-quality images. The compression of about 40:1, which is expected based on MPEG standards, does not provide sufficient quality for real-time high quality video transmission over digital networks.

Using the methods of the present invention, one can compress the image so that only 3-5 kbytes/frame are needed. Thus, using methods of this invention, one can obtain compressions in the range of about 50:1 to about 120:1 for full-sized television or computer screens. It can be appreciated that smaller screen sizes (e.g., for a hand-held device) can operate using even higher compression ratios, e.g., up to about 480:1 for a screen having ¼ the size of a television or computer monitor. For even smaller sized screens, the amount of compression can be increased, so that if only ⅛ of a full-sized screen is used, the overall compression can be 960:1, and for very small screens, e.g., about ¹⁄₁₆ the size of a full-sized screen, a compression ratio of about 1960 can be used. It can also be appreciated that with higher degrees of compression, more information can be transmitted per unit time.

Once high frequency coefficients of the WT of the Y component of a frame are obtained, they can be compared 116 to those of a previous frame ("anchor frame"). If the number of significant differences 118 is above an adaptively determined threshold, the new frame becomes the current anchor frame 120 and is encoded 122. Otherwise, the frame can be dropped with the proviso that the number of consecutively dropped frames desirably does not exceed a certain maximum number. Such a number and the threshold of differences can be adjusted dynamically to increase or decrease the level of compression, depending on the continuously monitored network congestion and user network access bandwidths. This process is described in further detail below in FIG. 1B.

Additionally, dropping frames can be used to decrease the total number of bits transmitted. For example, human perception has a property known as "flicker fusion" in which a series of still images shown rapidly enough, give rise to the appearance of motion. For the human visual system, flicker fusion occurs typically at a frequency of about 16 frames/second to about 20 frames/second. Higher quality motion can be achieved using a rate of about 30 frames/second, which is readily interpreted as continuous motion. Thus, if a series of video images is captured at a rate of 30 frames/second, and every second frame is dropped, the effective rate is 15 frames/second, which to many people appears to be continuous motion. However, using the methods of this invention, more frames can be dropped, e.g., 2 of every 3, or 3 of every 4, 4 of every 5 or 5 of every 6. By dropping entire frames, the total numbers of bits needed to be transmitted can be reduced by a factor equal to the ratio of dropped frames to transmitted frames. Thus, if a video compression method compresses video data by 120:1, and if 5 of every 6 frames are dropped, the overall effective compression ratio is 120×6:1 or 720:1. If a compression of 1960:1 is used and 5 of every 6 frames is dropped, the effective compression ratio is 1960×6:1=11,760. It can be readily appreciated that these unprecedented degrees of compression can permit very rapid transmission of video signals over all kinds of networks. Dropping frames can be likened to the temporal equivalent to a spatial frame size reduction. As in the case of spatial data reduction, the temporal data reduction can help with the level of video compression, but if the perceived video quality suffers at the receiving end, it is not acceptable. The ability to interpolate, with high quality and speed, between decompressed anchor frames at the receiving end is another novel aspect of this invention. State of the art video interpolation methods use algorithms that are too complex for real-time software implementation.

The next compression step includes encoding of the WT coefficients 122, 123. An efficient encoding technique in terms of compression for WT coefficients is the EZW technique described in "Embedded Image Coding Using Zerotrees of Wavelet Coefficients", J. M. Shapiro, IEEE Transactions on Signal Processing, Vol. 41, No. 12, December 1993, incorporated herein fully by reference. In this step, one can select those WT coefficients that are most desirable for decompressed image quality, and one can assign more or fewer bits to them depending on their relative importance in visual perception. However, this prior art technique requires several passes through the WT of each YUV component and consequently may take too long to permit real-time, high-quality video transmission.

We developed a novel WT encoding method that can result in about the same compression efficiency as the EZW technique, but is much faster because encoding can be accomplished in a single pass.

A subsequent step of data compression includes lossless Arithmetic Encoding 110 described in "Arithmetic Coding for Data Compression", I. H. Witten, R. Neal, J. G. Cleary, Communications of the ACM, Vol. 30, June 1987, incorporated herein fully by reference. This process can further reduce the original image without losing additional information in the encoding step.

The compressed data can then be stored and/or transmitted 124.

On the decompression side 126, both the compressed video and audio streams are typically arithmetically decoded separately 128. Then, the video signal can be decoded 130 by inverting innovative encoding process used on the compression side. The output is the WT of each frame YUV component.

The next step includes an innovative enhancement procedure 132 of the WT followed by a standard Inverse Wavelet Transform 124, resulting in reconstructed YUV components of the original frames.

After that, another innovative step 136 can be carried out, in which the time stamps of the reconstructed audio packets and those of the frame YUV components are compared to synchronize their output to the video and audio cards.

Because of the speed of the previous video processing steps, it is not unusual for the video stream to be ahead in time of the audio 138. In this case, an innovative fast adaptive interpolation technique can be applied to generate additional video frame YUV components, which "fill in" the stream with video signals, effectively "slowing" the video stream and thereby can result in a perfectly synchronized and smooth video output.

Alternatively, if the video decompression falls behind the audio decompression, video frames can be dropped to "speed up" the video stream to match that of the audio stream, which must dictate the pace of the combined video/audio output.

The next step is enlarging 140 (expansion). Such expansion can provide a lot of data per frame (twice the Y size in a 4:2:2 format), which must be generated very fast and with high quality. This invention includes an innovative frame expansion method 140 that accomplishes just that.

At this point, the Y components are of size 320×240 and the UV components are of size 160×240, and they can be enlarged to 640×480 and 320×480, respectively, in order to recover the original size and display the video full screen on a TV set.

If it is desired to display the video on a high resolution PC monitor, the enlargement should be 1280×960 (Y) and 640×960 (UV). One can appreciate that other sizes and formats are possible for compression and decompression of video signals without departing from the invention.

The end result produced by the video and audio cards 142 at the decompression end of the system, is full-screen full-motion high-quality synchronized video/audio in real-time 144.

It should be noted that using the methods of this invention, every video frame undergoes the same processing and is treated individually. This is in contrast with current state-of-the-art video compression approaches mostly based on MPEG that distinguish between anchor frames and difference frames in order to improve their compression efficiency without really affecting it in any significant way but becoming prone to catastrophic failures if any anchor frame is corrupted or lost. Thus, the methods of this invention can ameliorate many of the problems with conventional digital video transmission.

The methods of this invention can be used in conjunction with error detection and correction techniques such as file metacontent of Digital Fountain Corporation described in "A Scalable and Reliable Paradigm for Media on Demand", G. B. Horn, P. Kundsgaard, S. B. Lassen, M. Luby, J. F. Rasmussen, IEEE Computer, September 2001, incorporated herein fully by reference. Such error detection and correction methods can provide increased reliability of transmission (in some cases of 100%) with reduced overhead (in some cases of only 5%).

These methods can take advantage of the latest advances in processor architecture and corresponding software tools in order to achieve real-time performance through the parallel processing provided by SIMD and MMX technologies available, for example, with Pentium III and IV processors.

II. Detailed Description of Processing Steps

Based on the above general description of this methodology capable of providing such truly innovative demonstrated results, in this section the innovative steps that together result in such performance are discussed in detail.

A typical first step in network transmission is capture of audio and video signals, as described above. Then, a Video Size Reduction step can be carried out in which a certain number of pixels are dropped from the image. For example, if every second pixel is dropped per row and per column, only ¼ of the original number of pixels remain to be encoded. Thus, the amount of transformation can be reduced. At the reconstruction side, the dropped pixels can be recreated by high quality enlargement.

A. Selection of Wavelet Basis

Wavelet filters used in and recommended by this methodology include asymmetrical filters of the type described in "Sub-band Coding of Images Using Asymmetrical Filter Banks", O. Egger, W. Li, IEEE Transactions on Image Processing, Vol. 4, No. 4, April 1995, incorporated herein fully by reference. The technical literature relating to the application of the WT to image processing asserts that symmetrical filters are the best to accurately represent an image on both sides of the different edges.

The research leading to the development of the methodology of this invention showed that that was not the case. Rather, improved compression and quality of reproduction were obtained with asymmetrical filters of length 9 for low-pass analysis and length 3 for high-pass analysis. However, it can be appreciated that other lengths of asymmetrical filters can be used and can provide improved quality and transmission speed compared to prior art methods.

However, improved performance was achieved after normalization of such filters. Without this innovative step of normalizing asymmetrical filters, their performance was not significantly better than that of symmetrical filters. However, normalization made a very significant difference.

Filters can be normalized, by making the squares of their coefficients add up to one. As a result, the filters used advantageously using methods of this invention can have very different coefficients from those presented in the literature, e.g. "Sub-band Coding of Images Using Asymmetrical Filter Banks", O. Egger, W. Li, IEEE Transactions on Image Processing, Vol. 4, No. 4, April 1995, incorporated herein fully by reference.

Selected wavelet filter coefficients can then be applied in a standard fashion as described in "Ten Lectures on Wavelets", I. Daubechies, Society for Industrial and Applied Mathematics, Philadelphia, 1992, herein incorporated fully by reference. Such application involves repeatedly convolving them with the given frame up to four levels of transformation.

B. Differences with Anchor Frames

High frequency (IF) coefficients of the first level of the WT of a given frame can be compared to those of a previous frame according to the following logic: A flow chart describing this process is presented in FIG. 1B.

1. Set count to 0;
2. For all HF coefficients do;
3. D=Difference with corresponding coefficient in same position of anchor fre;
4. If D>threshold, then count=count+1;
5. Go to 2
6. If count >N (allowed maximum number of changes for dropping frames that can be easily interpolated later) then proceed with calculation of WT and its encoding. Make this frame the new anchor frame;
7. Else drop the frame and proceed to process a new frame.

C. Encoding WT Coefficients

An efficient WT coefficient encoding/decoding state-of-the-art scheme as described in "Embedded Image Coding Using Zero trees of Wavelet Coefficients", J. M. Shapiro, IEEE Transactions on Signal Processing, Vol. 41, No. 12, December 1993, incorporated herein fully by reference, requires multiple passes through the set of WT coefficients of a given frame. Because of the large number of coefficients (twice the number of pixels for a 4:2:2 format), this approach is not ideally suited for real-time performance, because not just the values but also the locations of significant coefficients must be encoded.

In order to achieve fast encoding/decoding of the WT coefficients, the methods of this invention use one or more novel steps to encode and decode the WT coefficients in a single pass. In the first place, in certain embodiments, all the low frequency coefficients can be encoded with their exact values (8 bits/coefficient), and the higher frequencies significance thresholds that can be controlled to achieve more or less compression can be varied with the level of transformation.

In certain embodiments of this invention, the significance thresholds can be controlled by the receiver. A transmitter device can query the receiver and can obtain information relating to the bandwidth capabilities of the receiver. Additionally, network configuration and the number of "hops" of a data packet can be analyzed in real time to provide a total capacity of the network and the receiver. Based on that information, the encoder can tailor the significance thresholds to suit particular, and even varying bandwidths. Moreover, because the query and answer can occur very rapidly, it is possible for an encoder to provide differently encoded signals to different users. In certain embodiments, the threshold can be optimized by beginning with an arbitrary and relatively low threshold for discarding coefficients. Then, a reiterative process can be carried out, in which significance thresholds can be increased by, for example, 2 times, 3 times, 4 times, 5 times, or even higher, until a desired degree of speed in network transmission is obtained. One can increase thresholds as high as one wishes, so long as the quality of the reconstructed signal is within a desirable range determined by the application.

The lower the level of transformation the lower the significance threshold and vice versa. This is based on the fact that, from a visual perception point of view, the accuracy of the lower frequency components is more important than that of the higher frequencies that correspond to the higher levels of the WT. This means that proportionately more lower frequency coefficients are kept to be encoded than higher frequency coefficients. Also, in order to increase compression, the order in which the high frequency coefficients are encoded can be important. Encoding coefficients row by row, which is the standard approach, is not ideal because it does not take full advantage of the arithmetic encoder capabilities. By contrast, this invention processes higher frequency WT coefficients in descendant order. There is a correlation between high frequency WT coefficients from level to level: if a coefficient is insignificant at a given level, there is a high probability that all its descendants at higher levels are also insignificant. Thus, if a high frequency coefficient at level 4 is not significant, i.e., is below the significance threshold for level 4, its 4, 16, 64 descendants at levels 3, 2, 1 respectively, are probably also below the corresponding significance thresholds. Since each insignificant coefficient can be encoded with just one zero bit, there will be a long sequence of 85 zero bits that the lossless arithmetic encoder can compress very effectively. Such long sequences of zeros may not be found if the coefficients are processed row by row.

Figure 5:
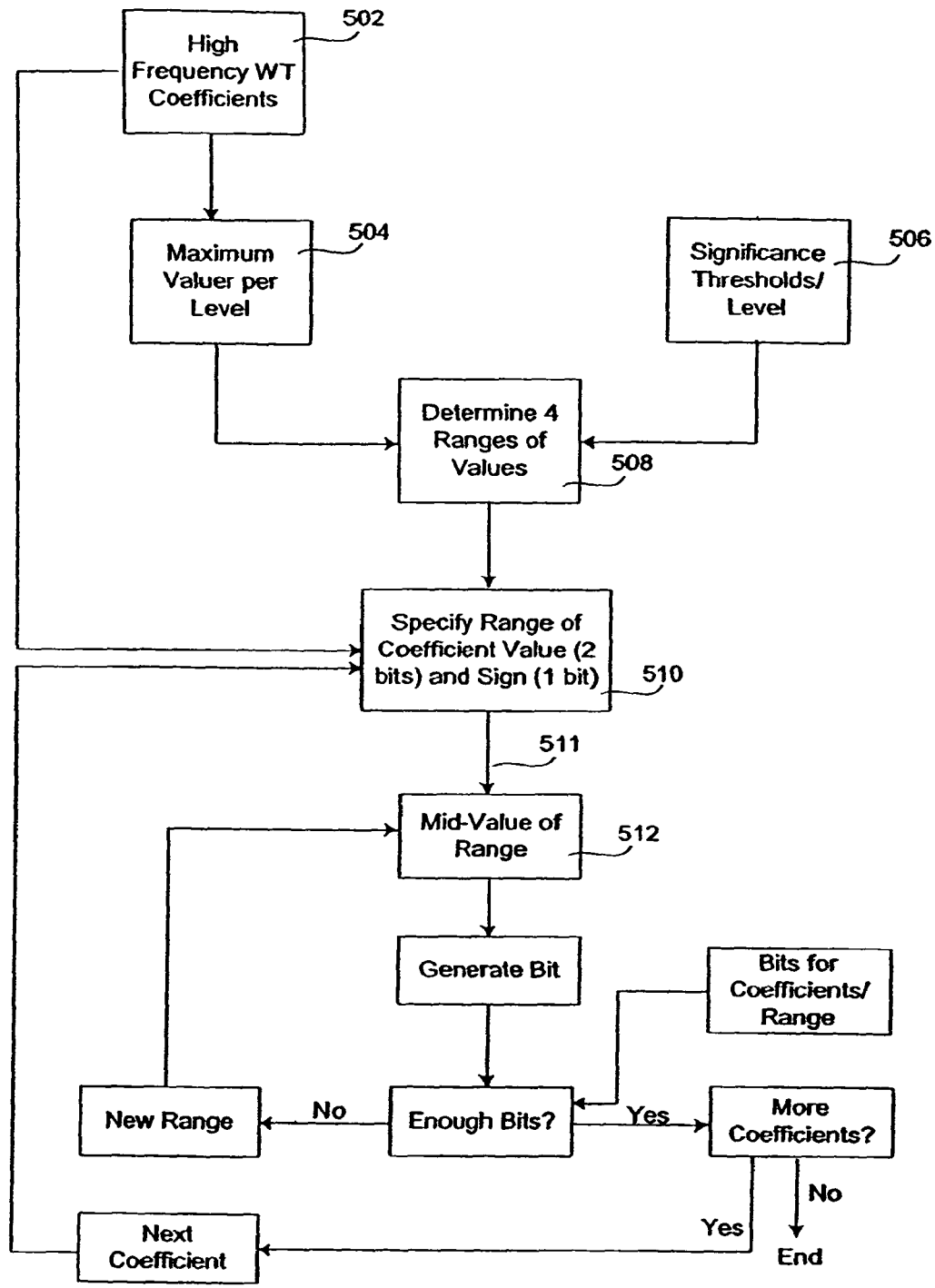
FIG. 5 depicts a schematic diagram of a one-pass encoding of high frequency wavelet transform coefficients of this invention.

The one-pass encoding process for WT coefficients arranged in descendant order is shown in FIG. 5. FIG. 5 represents an expanded flow chart for element 122 of FIG. 1A. Four ranges of coefficient values are depicted established from a maximum to the significance threshold value. Thus, 2 bits are required to specify the range for each coefficient plus one bit for the sign. The absolute values can then encoded with the process indicated, and using the number of bits assigned to each range that can be controlled as an input parameter, one can achieve more or less compression.

The above-described encoding process can be expressed in pseudo-code as follows:

1. Determine the maximum absolute values 504 of the HF coefficients of each of the transformation levels of the WT of the given frame;
2. Input the significance thresholds (minimum absolute values) 506 for the HF coefficients of each level;
3. Determine four ranges of coefficient values 508 between the maximum and the minimum;
4. Input the number of bits to be allocated to each range;
5. For each HF coefficient of the given frame taken in descendant order, determine its range and sign and initialize n=number of assigned bits to zero 511;
6. Determine V=mid value of the range 512;
7. If the coefficient absolute value C is less than or equal to V, assign a 0 to represent C. Make n=n+1;
8. Else assign a 1 to C and make n=n+1;
9. If n=N=number of bits allocated to the range of C, go to 5;
10. Else narrow down the range of C. If the bit just allocated was a zero, the maximum value of the new range becomes the mid value of the previous range and the minimum value remains the same. Else, the new minimum value is the previous mid range and the maximum remains the same;
11. Go to 6.

Figure 1B:
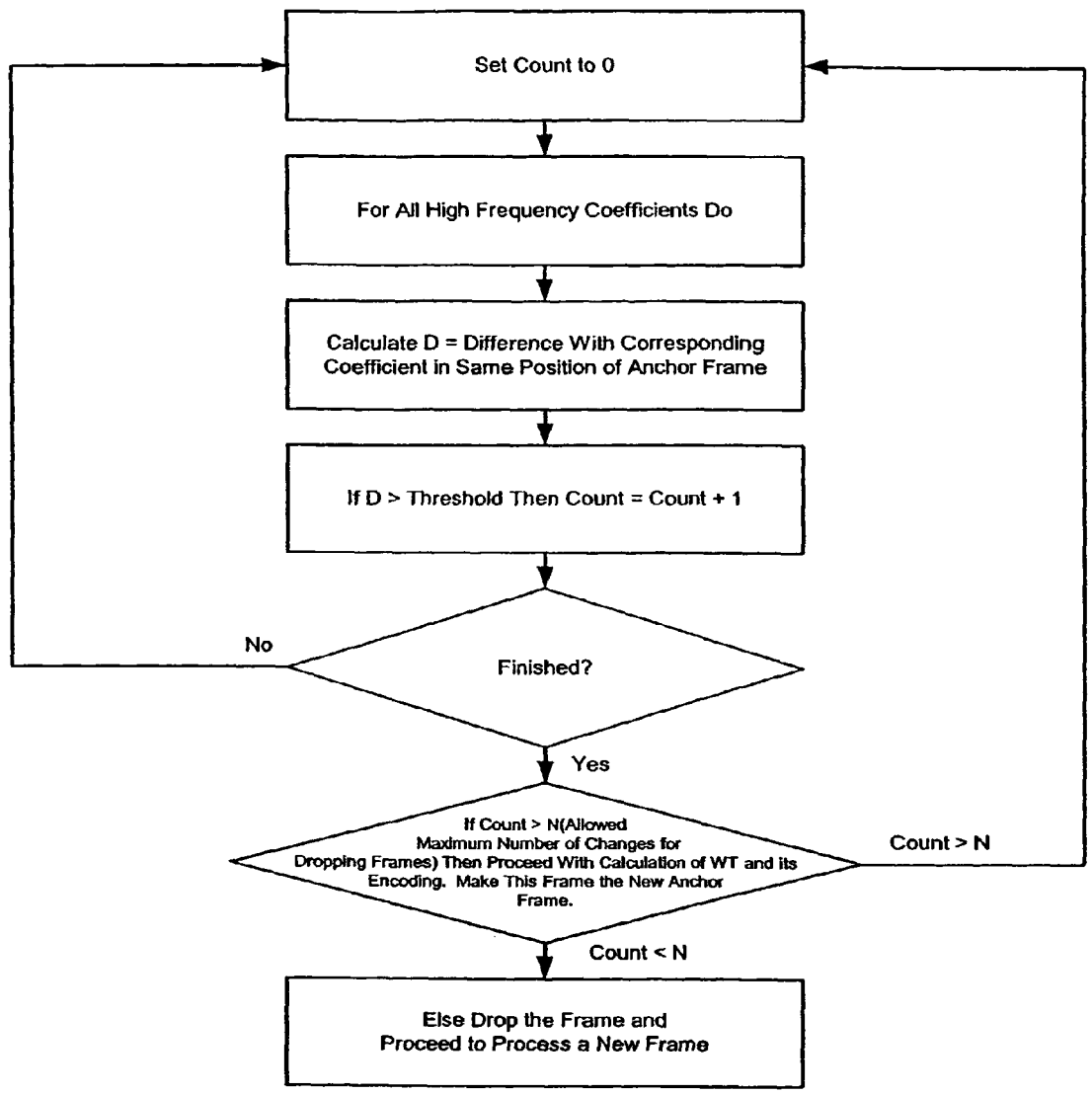
FIG. 1B depicts a schematic diagram of one part of the functional description of this invention shown in FIG. 1A.

FIG. 1B depicts schematically, the process described above in pseudocode.

Figure 6:
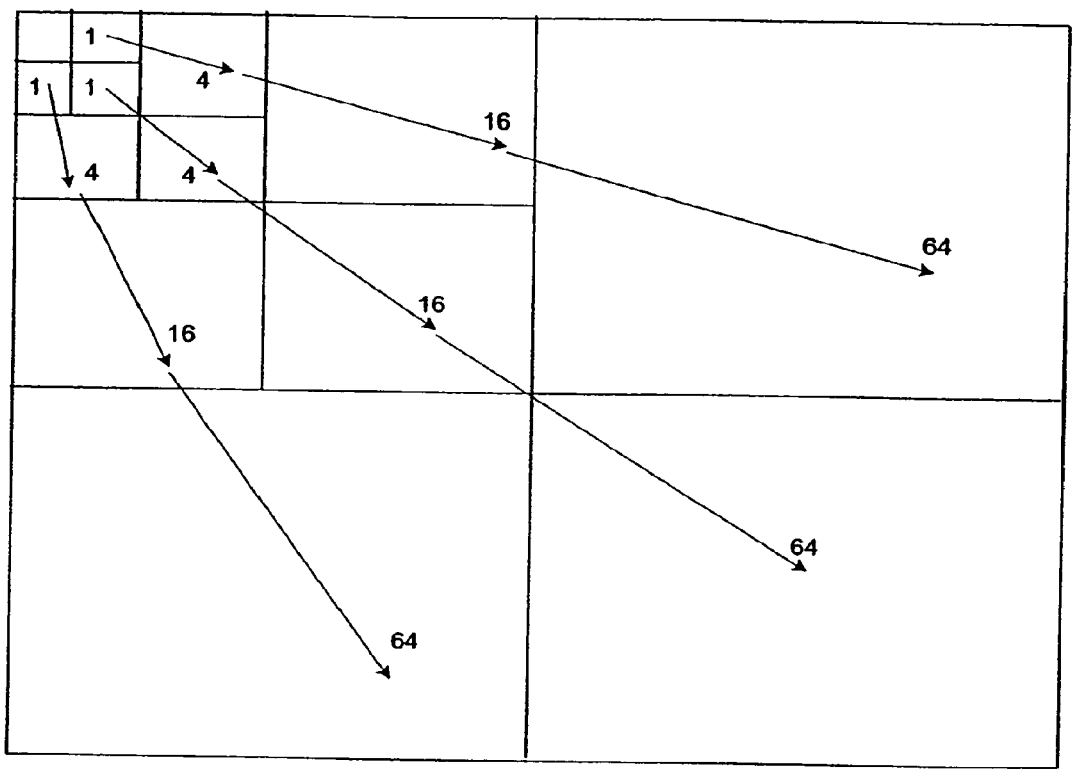
FIG. 6 depicts high frequency coefficient descendants obtained using methods of this invention.

FIG. 6 depicts schematically HF coefficient descendants corresponding to the methods of this invention.

D. Decoding

Decoding follows the inverse process and results in reconstructing all the significant WT coefficients.

The order of reconstruction is indicated in FIG. 6. Each level 4 HF WT coefficient and its 84 descendants are reconstructed in sequence according to the following pseudocode:

1. If the significance bit is zero, get next bit for significance of next coefficient.
2. Else get next bit for sign and next two bits for range of absolute value.
3. Initial estimate=mid-range value.
4. Iterate on n=number of bits allocated to values of the range narrowing down the range with each additional bit. A one bit results in a new range which is the upper half of the current range. A 2 bit results in a new range which is the lower half of the current range.
5. Assign the sign to the resulting value for the location being considered in the descendant chain of the WT coefficient of level 4.
6. Repeat for all HF WT coefficients of level 4.
7. Since the LF coefficients of level 4 are reproduced exactly (8 bits), this will complete the 4-level WT reproduction of a single frame.

E. Enhancement of the Wavelet Transform

Figure 7:
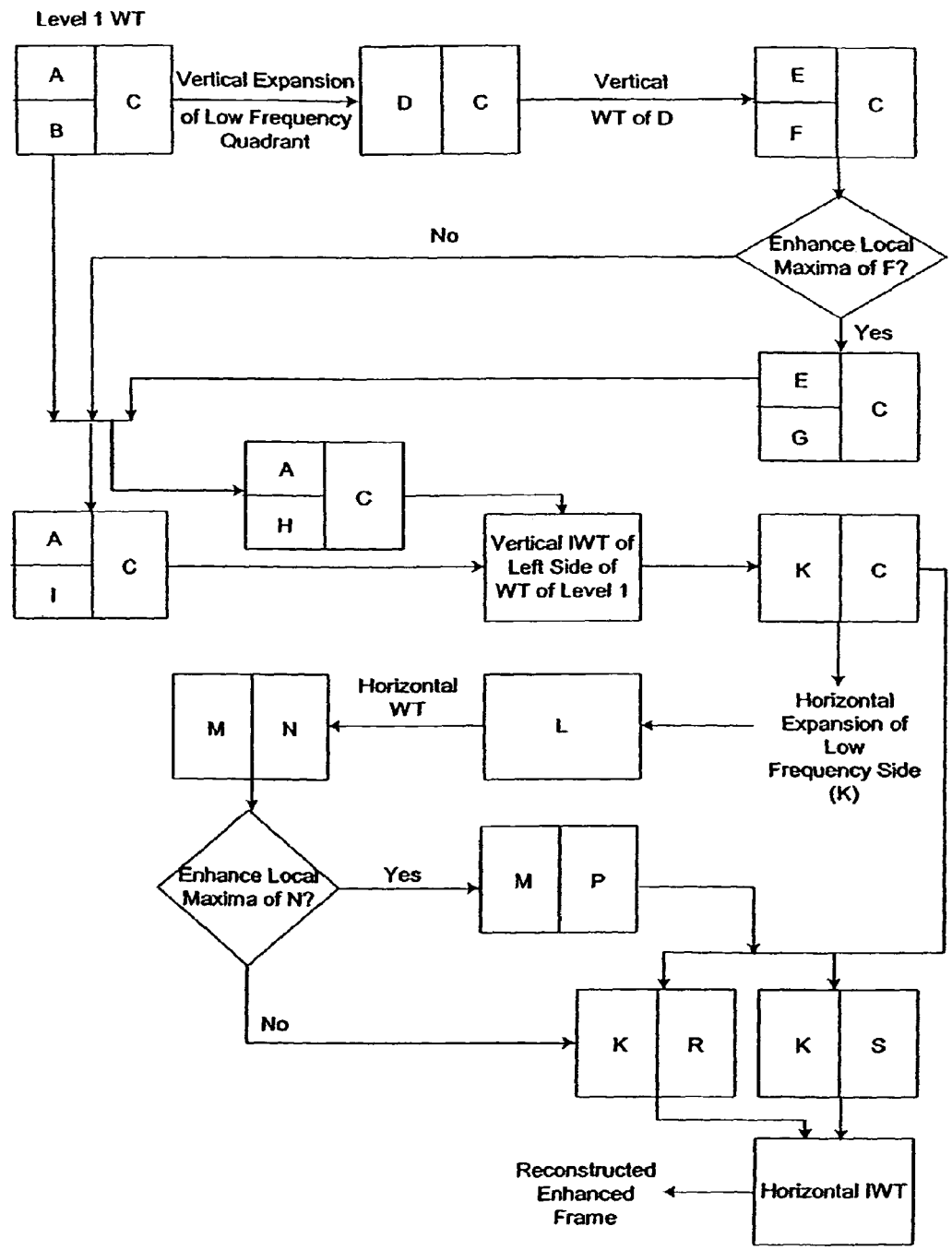
FIG. 7 depicts an enhancement procedure of this invention for level 1 coefficients of the wavelet transform.

After decoding of the WT coefficients at the decompression side, a standard Inverse WT (IWT) algorithm using the synthesis filters corresponding to the analysis filters of the compression side can recover the original frame YUV components, i.e., one 320×240 Y component and two 160×240 U and V components. Because of compression, some information has been lost, and the recovered frames may not be exact replicas of the originals, although perceptually they may be very close. In order to improve the perceived quality of the recovered frames, this invention includes an innovative enhancement step based on the mathematics of the WT prior to applying IWT processing. It is depicted in FIG. 7. FIG. 7 depicts a flow chart of block 132, in greater detail, of FIG. 1.

Sharp edges enhance the appearance of images. The WT identifies perceptually important edges in an image because the coefficients corresponding to those locations are of high magnitude.

FIG. 7 shows level 1 of the WT of an image (frame). A represents the low frequency coefficients of the low frequency side, B represents the high frequency coefficients of the low frequency side and C represents the high frequency side. C can also have low and high frequency quadrants like A and B of the low frequency side but it is not necessary for the WT decomposition and, in fact, it is faster not to decompose C any further.

Using the expansion technique described below in section F below, A can be expanded vertically and converted into D, which is an estimate of the low frequency side of the level 1 WT of the original image. The vertical (by columns) WT of D provides E and F. E can be close to A, but all the zero values in B have become non-zero (however small) values in F and the non-zero values of B have similar corresponding values in F. In other words, F is a better reconstruction of the original values of the WT of the original image in the F locations with the corresponding positive impact on the final reconstructed image.

At this point, local maxima of F can be enhanced (boosted or scaled) to improve the final image quality. Since there is a trade-off involved between reconstruction speed and reconstruction quality, this additional enhancement step may be omitted if there is insufficient CPU computational power.

The last step in vertical enhancement includes replacing back the original A coefficients for the E coefficients, and replacing the non-zero B-coefficients in the corresponding locations of F, resulting in the H set of coefficients for the case in which the high frequency coefficients' local maxima are not boosted. For the case in which such coefficients are boosted, the local maxima of B are boosted first before replacing them in G resulting in the I set of coefficients.

The vertical IWT of the resulting low frequency side of the level 1 WT of the original image can result in the K set of coefficients. It can be appreciated that there are two different K sets, depending on whether the local maxima of the high frequency quadrant have been boosted or not, but both are referred to as K in FIG. 7.

Finally, all the previous steps can be repeated horizontally starting with the K and C sets of coefficients as shown in FIG. 7.

The final IWT results in an enhanced reconstructed image (frame).

The enhancement boosting step of the invention can boost local maxima of the WT coefficients and then can adjust the remaining WT coefficients in such a way as to preserve the integrity of the IWT of the result. The adjustment values can be chosen such that the resulting coefficients are WT coefficients of an enhanced version of the original signal. The local maxima of the WT coefficients can be boosted by multiplying those values by a scaling constant which is an input parameter that can be controlled. The adjustment values for the other coefficients can be arrived at by minimizing an error function.

By a local maximum, it is meant a high frequency WT coefficient having a magnitude in excess of the magnitude of its neighbors.

It is known in the WT field "Special Issue on Wavelets," Proceedings of the IEEE, April 1996, herein incorporated fully by reference, that in order for a set of coefficients $\{a_1, a_2, \ldots a_n\}$ to constitute a set of valid WT coefficients, certain relationships must exist between the coefficients.

For a function f(x) to be represented as a sum of weighted wavelet basis functions, $$f(x) = \sum_k a_k \psi_k(x)$$

the $a_k$ must satisfy $$\sum_k a_k = 1 \quad \sum_k a_k a_{k+e} = 0 \text{ for } e \neq 0$$

$$\sum_k a_{2k+1} = 1 \quad \sum_k a_k \bar{a}_k = 2$$

Where $\bar{a}_k$ is the complex conjugate of $a_k$.

If some of these coefficients are replaced by $c_j a_k$ where $c_j$ is the scaling constant for local maxima of level j, the resulting set of perturbed coefficients would not satisfy in all probability the foregoing conditions.

In order to ensure that the perturbed coefficients are still a valid set of WT coefficients, the WT coefficients that are not local maxima must be adjusted to correct for the perturbation caused by replacing the local maxima with scaled local maxima.

An error function $E_j(x_i)$ is chosen such that when added to the perturbed coefficients, the resulting output of WT coefficients satisfies two conditions: a) at the rows and columns corresponding to the local maxima, the original local maxima of the WT coefficients are obtained and b) the sum of the differences between the enhanced and original WT coefficients and the rate of change of such differences is minimized.

In other words, using a more explicit notation, $$E_j(x_i) = W_j(x_i) - C_j W_j(x_i) \text{ for } i=1 \text{ to n\_maxima},$$

where $x_i$ is the ith local maxima, n_maxima j is the number of local maxima at stage j and $W_j(x_i)$ represents the WT coefficient at location $x_i$. The level of interest is normally j=1, although different enhancement effects can be achieved by using different combinations of levels to boost their local maxima.

Condition b) can be satisfied by minimizing, for each gap between consecutive local maxima $x_i$ and $x_{i+1}$, the definite integral $$\int_{x_i}^{x_{i+1}} \left\{ [E_j(x)]^2 + 2^{2j} \left[\frac{d}{dx} E_j(x)\right]^2 \right\} d_x$$

where the second term of the integrand is included to prevent spurious local maxima from distorting the solution.

The above definite integral can be minimized by solving the differential equation, $$E_j(x) - 2^{2j} \frac{d^2}{dx^2} E_j(x) = 0$$

the general solution of which is, $$E_j(x) = \alpha e^{\left(\frac{x}{2^j}\right)} + \beta e^{-\left(\frac{x}{2^j}\right)}$$

The constants $\alpha$ and $\beta$ are then chosen to satisfy the boundary conditions imposed by condition a) at $x_i$ and $x_{i+1}$.

$$\alpha = \frac{E_j(x_i)e^{-x_{i+1}/2^j} - E_j(x_{i+1})e^{-x_i/2^j}}{e^{(x_i-x_{i+1})/2^j} - e^{(x_{i+1}-x_i)/2^j}};$$

$$\beta = [E_j(x_i) - \alpha e^{x_i/2^j}]e^{x_i/2^j}$$

The above formulas provide a fast and effective method for modifying the decoded WT coefficients prior to applying the standard IWT algorithm. After the IWT is performed, an enhanced version of the decompressed frame is obtained. Experiments have verified the speed and effectiveness of this processing step of the invention.

F. Video/Audio Synchronization/Interpolation

This is another innovative step in the methodology of the invention. First, each reconstructed frame, after the IWT, has a header that includes a time stamp of its time of capture. Similarly, each audio packet, after arithmetic decoding, has its corresponding time stamp.

Audio packets, once they are decoded, are placed in a buffer used by the audio card for play back at a rate specified by the sampling rate which is part of the header. Audio cannot be interrupted, and therefore drives the synchronization process between the video and audio data.

When the video is behind, video frames can be dropped. When the video is ahead, new frames can be interpolated between consecutive frames to slow down the video to the real-time reference provided by the audio.

The above frame dropping and/or interpolation is an adaptive process, with the number of interpolated frames being a function of the changing differences in time stamps between the video and the audio.

The interpolation process is simple, fast and effective, in that no ghost images can be perceived.

It comprises assigning pixel values to the interpolated frames, that are weighted values of the corresponding pixels of the real (not interpolated) frames on both sides. The weights are inversely proportional to the distances in time between the interpolated frame and the real frames on both sides.

In contrast with all the complex schemes for frame interpolation in the prior art, this simple approach works very well in real-time.

G. Frame Expansion

This last step of the invention can produce high quality full-screen frames for display on a TV set or PC Monitor. Because of the amount of data involved, standard approaches can be very time-consuming and cannot produce high quality enlargements in any case.

The techniques developed to complete the frame expansion methods of the invention can be simple computationally, i.e., fast, and can generate enlarged images of high quality with no pixelization and showing none of the blocking artifacts that plague state-of-the-art techniques. The methods of this invention can be applied repeatedly with similar results and enlargement factors of 4 every time it is applied. Overall enlargement factors of more than 1000 have been demonstrated.

The image expansion technique of this invention is based on the fact that the given image can be considered to be the level 1 low frequency component of the WT of a higher resolution image which is four times larger. One way to accomplish this is to estimate the missing high frequency WT coefficients of level 1 from the given low frequency coefficients.

A discussion of wavelet theory is provided in "Ten Lectures on Wavelets", I. Daubechies, Society for Industrial and Applied Mathematics, Philadelphia, 1992, incorporated herein fully by reference. However, in brief, wavelets are functions generated from a single function $\Psi$ by dilations and translation.

$$\Psi_n^j(x) = \frac{\Psi(2^j x - n)}{\sqrt{2}} \quad (1)$$

Where j corresponds to the level of the transform, and hence governs the dilation, and n governs the translation.

The basic idea of the wavelet transform is to represent an arbitrary function f as a superposition of wavelets.

$$f = \sum_{j,n} a_n^j(f) \quad (2)$$

Since the $\Psi_n^j$ constitute an orthonormal basis, the wavelet transform coefficients are given by the inner product of the arbitrary function and the wavelet basis functions:

$$a_n^j(f) = \langle \Psi_n^j, f \rangle \quad (3)$$

In a multiresolution analysis, one really has two functions: a mother wavelet $\Psi$ and a scaling function $\phi$. Like the mother wavelet, the scaling function $\phi$ generates a family of dilated and translated versions of itself:

$$\phi_n^j(x) = 2^{-j/2}\phi(2^{-j}x - n) \quad (4)$$

When compressing data files representative of images, it can be desirable to preserve symmetry. As a result, the requirement of an orthogonal basis may be relaxed (although it is not necessary) and biorthogonal wavelet sets can be used. In this case, the $\Psi_n^j$ no longer constitute an orthonormal basis, hence the computation of the coefficients $a_n^j$ is carried out via the dual basis, $$a_n^j(f) = \langle \tilde{\Psi}_n^j, f \rangle \quad (5)$$

where $\tilde{\Psi}$ is a function associated with the corresponding synthesis filter coefficients defined below.

When f is given in sampled form, one can take these samples as the coefficients $x_n^j$ for sub-band j=0. The coefficients for sub-band j+1 are then given by the convolution sums:

$$X_n^{j+1} = \sum_k h_{2n-k} X_k^j \quad \text{for low frequency coefficients, and} \quad (6a)$$

$$C_n^{j+1} = \sum_k g_{2n-k} X_k^j \quad \text{for high frequency coefficients} \quad (6b)$$

This describes a sub-band algorithm with:

$$h_n = \frac{\int \varphi(x-n)\varphi(x)dx}{\sqrt{2}} \quad (7a)$$

representing a low-pass filter and $$g_l = (-1)^l h_{-l+1}, \quad (7b)$$

representing a high-pass filter. Consequently, the exact reconstruction is given by:

$$X_1^j = \sum_n (\bar{h}_{2n-1} X_n^{j+1} + \bar{g}_{2n-1} C_n^{j+1}), \quad (8)$$

where $\bar{h}_{2n-1}$ and $\bar{g}_{2n-1}$ represent the reconstruction filters.

The relation between the different filters is given by:

$$g_n = (-1)^n h_{-n+1} \text{ or } g_n = (-1)^{n+1} \bar{h}_{-n+1} \text{ (biorthogonal)} \quad (9a)$$

$$\bar{g}_n = (-1)^n \bar{h}_{-n+1} \text{ or } \bar{g}_n = (-1)^{n+1} h_{-n+1} \text{ (biorthogonal)} \quad (9b)$$

$$\sum_n h_n \bar{h}_{n+2k} = \delta_{k,0} \text{ (delta function)} \quad (9c)$$

where $h_n$ and $g_n$ represent the low-pass analysis filter and the high-pass analysis filter respectively, and $\bar{h}_n$ and $\bar{g}_n$ represent the corresponding synthesis filters.

We now turn to a matrix modified formulation of the one-dimensional wavelet transform. Using the above impulse responses $h_n$ and $g_n$, we can define the circular convolution operators at resolution $2^j$: $H^j$, $G^j$, $\bar{H}^j$, $\bar{G}^j$. These four matrices are circulant and symmetric. The $H^j$ matrices are built from the $h_n$ filter coefficients and similarly for $G^j$ (from $g_n$), $\bar{H}^j$ (from $\bar{h}_n$) and $\bar{G}^j$ (from $\bar{g}_n$).

The fundamental matrix relation for exactly reconstructing the data at resolution $2^{-j}$ is $$H^j \bar{H}^j + G^j \bar{G}^j = I^j \quad (10)$$

where $I^j$ is the identity matrix.

Let $X^{j+1}$ be a vector of low frequency wavelet transform coefficients at scale $2^{-(j+1)}$ and let $C_x^{j+1}$ be the vector of associated high frequency wavelet coefficients. We have, in augmented vector form:

$$\begin{vmatrix} X^{j+1} \\ C_x^{j+1} \end{vmatrix} = \begin{vmatrix} H^j & 0 \\ 0 & G^j \end{vmatrix} \times \begin{vmatrix} X^j \\ X^j \end{vmatrix} \quad (11)$$

where $X^{j+1}$ is the smoothed vector obtained from $X^j$. The wavelet coefficients $C_x^{j+1}$ contain information lost in the transition between the low frequency bands of scales $2^{-j}$ and $2^{-(j+1)}$.

The reconstruction equation is $$X^j = |\bar{H}^j \bar{G}^j| \times \begin{vmatrix} X^{j+1} \\ C_x^{j+1} \end{vmatrix} \quad (12)$$

Since, from equation (11), $X^{j+1} = H^j X^j$, we can, in principle, recover $X^j$ from $X^{j+1}$ merely by inverting $H^j$. However, this is generally not practical both because of the presence of inaccuracies in $X^{j+1}$ and because $H^j$ is generally an ill-conditioned matrix. As a result, the above problem is ill-posed and there is, in general, no unique solution.

If we discard the high frequency coefficients, $C_x^{j+1}$, then equation (12) reduces to $y^j = \bar{H}^j X^{j+1}$ which is a blurred approximation of $X^j$.

From equation (11), $X^{j+1} = H^j X^j$, which gives $$\bar{H}^j X^{j+1} = \bar{H}^j H^j X^j \text{ or} \quad (13a)$$

$$X^{j+1} = H^j X^j. \quad (14)$$

In our problem, the $X^{j+1}$ (transformed rows or columns of level j+1) are known and the problem is to determine the $X^j$ of the next higher level.

This can be thought of as an image restoration problem in which the image defined by the vector $X^j$ has been blurred by the operator $H^j$, which due to its low-pass nature, is an ill-conditioned matrix.

Regularization, as in "Methodes de resolution des problems mal poses", A. N. Tikhonov and V. Y. Arsenin, Moscow, Edition MIR, incorporated herein fully by reference, is a method used to solve ill-posed problems of this type. This method is similar to a constrained least squares minimization technique.

A solution for this type of problem is found by minimizing the following Lagrangian function:

$$J(X^j, \alpha) = |X^{j+1} - H^j X^j|^2 + \alpha |G^j X^j|^2 \quad (15)$$

where $G^j$ is the regularization operator and $\alpha$ is a positive scalar such that $\alpha \to 0$ as the accuracy of $X^{j+1}$ increases.

It is also known from regularization theory that if $H^j$ acts as a low-pass filter, $G^j$ must be a high-pass filter. In other words, since $H^j$ is the low-pass filter matrix of the wavelet transform, $G^j$, must be the corresponding high-pass filter matrix.

Equation (15) may be also written with respect to the estimated wavelet transform coefficients $C_x^{j+1}$ and $\hat{X}^{j+1}$ (from equation (11)).

$$J(X^j, \alpha) = |X^{j+1} - \hat{X}^{j+1}|^2 + \alpha |C_x^{j+1}|^2. \quad (16)$$

Using the exact reconstruction matrix relation shown in Equation 10, we get:

$$X^{j+1} = H^j \bar{H}^j X^{j+1} + G^j \bar{G}^j X^{j+1}. \quad (16a)$$

Also, we can write $$\hat{X}^{(j+1)} = H^j X^j = H^j (\bar{H}^j X^{(j+1)} + \bar{G}^j C_x^{(j+1)}) \text{ (keep in mind that } X^j \text{ is estimated.)} \quad (16b)$$

Then subtracting (16b) from (16a) gives:

$$X^{j+1} - \hat{X}^{j+1} = G^j \bar{G}^j X^{j+1} - H^j \bar{G}^j C_x^{(j+1)} \quad (16c)$$

Substituting (16c) into (16) results in:

$$J(C_x^{(j+1)}, \alpha) = |G^j \bar{G}^j X^{j+1} - H^j \bar{G}^j C_x^{(j+1)}|^2 \alpha |C_x^{j+1}|^2. \quad (17)$$

By setting the derivative of J with respect to $C_x^{j+1}$, equal to zero, we can obtain the following estimate for the high frequency coefficients $C_x^{j+1}$:

$$C_x^{j+1} = M X^{j+1} \quad (18)$$

where the estimation matrix M is given by $$M = |\alpha I + \bar{G}_t^j H_t^j H^j \bar{G}^j|^{-1} \bar{G}_t^j H_t^j G^j \bar{G}^j \quad (19)$$

In which the subscript "t" refers to the matrix transpose.

Since the goal is to calculate an estimate of $X^j$ from $X^{j+1}$, using equation (12), we can write $$X^j = T X^{j+1} \text{ where T is the matrix} \quad (20)$$

$$T = \bar{H}^j + \bar{G}^j M \quad (21)$$

In other words, it is not necessary to calculate the high frequency coefficients $C_x^{j+1}$, although their determination is implicit in the derivation of the matrix T.

One can appreciate that, since we are dealing with a decimated Wavelet Transform, the matrix T is not square, but rather, it is rectangular. Its dimensions are n·n/2 where n is the size of the data before any given level of transformation. This can be verified from the following sizes for the Wavelet Transform matrices: H and G are n/2·n matrices and $\overline{H}$ and $\overline{G}$ are n·n/2. Notice that $\alpha I + G_t H_t H \overline{G}$ is a square matrix of size n/2·n/2 and is invertible if $\alpha > 0$ for all wavelet filters.

Another aspect of this invention is the structure of the matrix T. The rows of T are made up of just two short filters that repeat themselves every two rows with a shift to the right of one location. All other elements of the matrix T are zero. This means that every level of the Wavelet Transform can be recreated from the previous level (of half the size) by convolving both filters centered at a specific location of the available data with such data. This results in two new values from every given value thus doubling the size of the data at every level of signal decompression or expansion. There is no need to multiply the matrix T with the given vector. The two filters depend on the coefficients of the wavelet filters used to transform the original data in the case of compression while any wavelet filter coefficients can be used to determine the two expansion filters. The most significant criteria being quality and speed.

FIG. 8 presents a Matlab program that can be used to compute the matrix T that reveals the expansion filters for any wavelet basis.

For example, for a Daubechies –6 wavelet, the two filters that make up the matrix T are
$x_1 = 0.04981749973687$
$x_2 = -0.19093441556833$
$x_3 = 1.141116915831444$ and
$y_1 = -0.1208322083104$
$y_2 = 0.65036500052623$
$y_3 = 0.47046720778416$
and the T matrix is:

$$T = \begin{pmatrix} x_1 & x_2 & x_3 & & & & 0's \\ 0 & y_1 & y_2 & y_3 & & & 0's \\ 0 & x_1 & x_2 & x_3 & & & 0's \\ 0 & 0 & y_1 & y_2 & y_3 & & 0's \\ 0 & 0 & x_1 & x_2 & x_3 & & 0's \\ & & & \text{etc.} & & & \end{pmatrix}$$

Using other wavelet bases, similar expansion filters can be obtained. The following Table 1 provides the lengths of filters obtained with the Matlab program of FIG. 8 for some typical wavelet filters.

TABLE 1

| Expansion Filters Lengths | |
|---|---|
| Daubechies-4 | 2 |
| Daubechies-6 | 3 |
| Daubechies-8 | 4 |
| Biorthogonal | 3-4 |
| Asymmetrical | 2 |

It can be appreciated that better expansion quality can be obtained using longer filters, whereas naturally shorter filters can provide faster expansion.

It is important to notice that these expansion filters do not depend on the size of the data. By contrast, the undecimated Wavelet Transform results in full matrices with no zeros and whose elements change with the size of the data.

Thus, the practical advantages of the disclosed method are obvious in terms of computational complexity and capability to recreate signals with high quality from low frequency information alone.

With respect to images and video frames, the method is applied first to columns and then to rows. Also, for color images, the method is applied separately to the luminance (Y) and the chrominance (UV) components.

III. Protection From Piracy

In situations in which unauthorized use of transmitted images is to be discouraged, anchor frames can be selected randomly. When video compression using methods of this invention is decompressed, instead of displaying it at 30 frames per second (fps), it is displayed at a higher rate, e.g., 100 fps. A small proportion of such frames (10-15 fps) are of high quality while the rest are of poorer quality, but, because the frames are displayed so fast, and because the visual processing of human brains is very effective in visual interpolation, the perceived video quality is very high.

When using a camcorder to record such video from a display (e.g., television or PC monitor, either analog or digital), the amount of data is so large that it must be compressed for economic storage and/or distribution. This requires using a computer with a video capture board that has a limited capability to capture frames (presently less than 30 fps). Even if this capability is enhanced in the future, going beyond a speed of 30 fps defeats the purpose of video compression, and it is not needed, because human brains cannot perceive the difference between 30 fps and higher speeds.

Most of the frames captured by a capture board are of poor quality, which is made even worse by the compression process. When such frames are decompressed for playback, the video quality is so poor that it will be useless for financial gain by pirates.

In embodiments of this invention, the high quality frames in the original displayed sequences after decompression are separated by random time intervals, there is no discernible pattern of their locations in the displayed sequence of frames. Therefore, the only way to detect them in video sequences captured by a camcorder is through frame by frame evaluation by a human analyst. This process is prohibitively expensive in time and financial resources, and once good frames have been identified, an interpolation process will be unable to recreate the video in real time.

INDUSTRIAL APPLICABILITY

The use of wavelet transformation with decimation permits compressing, transmitting and decompressing information with greater speed and quality than currently available methods. The methods of this invention find application in video and/or video/audio digital transmission in network based industries, particularly in those in need of protection against camcorder piracy.

I claim:

1. A system, comprising:
   an input terminal configured to receive a video stream;
   input hardware having a capture mechanism coupled with the input terminal, and configured to output, in response to a received video stream, a plurality of video frames including a first video frame with a plurality of color format components;

a wavelet transformer coupled with the capture mechanism and configured to perform a plurality of levels of wavelet transformation of the first video frame by repeatedly applying asymmetric filtering a number of times to the first video frame that results in a plurality of wavelet transformation coefficients for the color format components of the first video frame, including a plurality of low-frequency coefficients and a plurality of high-frequency coefficients;

a comparator coupled with the wavelet transformer, and configured to compare the high-frequency coefficients to corresponding high-frequency coefficients of a current anchor frame as part of a determination to omit or encode the first video frame; and an encoder coupled with wavelet transformer and the comparator, and configured to encode the first video frame if the first video frame is to be encoded, by encoding the low-frequency and high-frequency coefficients, wherein the encoder is configured to encode the high-frequency coefficients in descendant order, with high-frequency coefficients of a higher level wavelet transformation encoded before high-frequency coefficients of a lower level wavelet transformation are encoded, and to encode some non-zero high-frequency coefficients as zeros.

2. The system of claim 1, wherein the encoder comprises a coefficient selection mechanism configured to determine a plurality of ranges of coefficient values for the low-frequency or high-frequency coefficients for a level of wavelet transformation, between a maximum coefficient value of the low-frequency or high-frequency coefficients of a particular level of wavelet transformation and a significance threshold of the particular level of wavelet transformation.

3. The system of claim 2, wherein the encoder is configured to encode a first of the low-frequency or high-frequency coefficients with a number of bits denoting which one of the ranges comprises the first low-frequency coefficient or the first high-frequency coefficient.

4. The system of claim 1, further comprising a communication interface coupled with the encoder and configured to transmit encoded video frames by transmitting encoded wavelet transform coefficients of the video frames output by the encoder, wherein the encoder is further configured to vary the encoding in response to a specified communication bandwidth.

5. The system of claim 1, wherein the wavelet transformer comprises at least one asymmetrical filter configured to differentially decimate low-frequency signals and high-frequency signals of video frames.

6. The system of claim 5, wherein said asymmetrical filter is a biorthogonal filter.

7. A method, comprising:
using a computing device to perform:
generating, in response to a video stream, a plurality of video frames including a first video frame with a plurality of color format components;
performing a plurality of levels of wavelet transformation of the first video frame by applying asymmetric filtering a number of times to the first video frame, to generate a plurality of wavelet transformation coefficients for the color format components of the first video frame, including a plurality of low-frequency coefficients and a plurality of high-frequency coefficient;
comparing the high-frequency coefficients to corresponding high-frequency coefficients of a current anchor frame as part of a determination to omit or encode the first video frame; and
encoding the first video frame if the first video frame is to be encoded, by encoding the low-frequency and high-frequency coefficients, including encoding the high-frequency coefficients in descendant order, with high-frequency coefficients of a higher level of wavelet transformation encoded before high-frequency coefficients of a lower level of wavelet transformation are encoded, and encoding some non-zero high-frequency coefficients as zeros.

8. The method of claim 7, wherein said encoding comprises determining a plurality of ranges of coefficient values for the low-frequency or high-frequency coefficients for a first level of wavelet transformation, between a maximum coefficient value of the low-frequency or high-frequency coefficients of the first level of wavelet transformation and a significance threshold of the first level of wavelet transformation.

9. The method of claim 8, wherein said encoding comprise encoding a first of the low-frequency or high-frequency coefficients with a number of bits denoting which one of the ranges comprises the first low-frequency coefficient or the first high-frequency coefficient.

10. The method of claim 7, wherein said encoding is responsive to a specified communication bandwidth available to transmit encoded wavelet transform coefficients of the video frames.

11. The method of claim 7, further comprising in response to the first video frame being encoded, setting the first video frame as a new current anchor frame.

12. An article of manufacture, comprising:
a non-transitory tangible computer-readable storage medium; and
a plurality of programming instructions stored in the tangible computer-readable medium, and configured to enable an apparatus, in response to execution of the instructions by the apparatus, to perform operations including:
generating, in response to a video stream, a plurality of video frames including a first video frame with a plurality of color format components;
performing a plurality of levels of wavelet transformation of the first video frame, by applying asymmetric filtering a number of times to the first video frame, to generate a plurality of wavelet transformation coefficients for the color format components of the first video frame, including a plurality of low-frequency coefficients and a plurality of high-frequency coefficients;
comparing the high-frequency coefficients to corresponding high-frequency coefficients of a current anchor frame as part of a determination to omit or encode the first video frame; and
encoding the first video frame if the first video frame is to be encoded, by encoding the low-frequency and high-frequency coefficients, including encoding the high-frequency coefficients in descendant order, with high-frequency coefficients of a higher level of wavelet transformation encoded before high-frequency coefficients of a lower level of wavelet transformation are encoded, and encoding some non-zero high-frequency coefficients as zeros.

13. The article of claim 12, wherein said encoding comprises determining a plurality of ranges of coefficient values for the low-frequency or high-frequency coefficients for a level of wavelet transformation, between a maximum coefficient value of the low-frequency or high-frequency coefficients of a particular level of wavelet transformation and a significance threshold of the particular level of wavelet transformation.

14. A system, comprising:
hardware including an input terminal configured to receive a first video frame of a plurality of video frames generated from a video stream, wherein the first video frame comprises encoded low-frequency coefficients and encoded high-frequency coefficients of color format components of a plurality of levels of wavelet transformation of the first video frame, wherein some non-zero high-frequency coefficients of the first video frame have been encoded as zeros;
a decoder coupled with the input terminal and configured to decode the encoded low-frequency coefficients and encoded high-frequency coefficients of the color format components of the plurality of levels of wavelet transformation of the first video frame;
an enhancer coupled with the decoder to enhance some of the decoded high-frequency coefficients; and
an inverse wavelet transformer coupled with the enhancer to perform a plurality of levels of corresponding inverse wavelet transformation, employing the decoded low-frequency coefficients and the enhanced some decoded high-frequency coefficients, to recover the color format components of the first video frame.

15. The system of claim 14, further comprising an expander coupled with the inverse wavelet transformer, and configured to generate an expanded version of the first video frame by considering the first video frame as low-frequency components of the expanded version of the first video frame after one wavelet transformation, and further configured to estimate high-frequency components of the expanded version of the first video frame after one wavelet transformation based on the low-frequency components.

16. A method, comprising:
using a computing device to perform:
receiving a first video frame of a plurality of video frames generated from a video stream, wherein said receiving comprises receiving encoded low-frequency coefficients and encoded high-frequency coefficients of color format components of a plurality of levels of wavelet transformation of the first video frame, wherein some non-zero high-frequency coefficients have been encoded as zeros;
decoding the encoded low-frequency coefficients and the encoded high-frequency coefficients;
enhancing selected ones of the decoded high-frequency coefficients; and
performing a plurality of levels of corresponding inverse wavelet transformation, employing the decoded low-frequency coefficients and the enhanced selected ones of the decoded high-frequency coefficients, to recover the color format components of the first video frame.

17. The method of claim 16, further comprising generating an expanded version of the first video frame by considering the first video frame as low-frequency components of the expanded version of the first video frame after one wavelet transformation, and estimating high-frequency components of the expanded version of the first video frame after one wavelet transformation based on the low-frequency components.

18. An article of manufacture, comprising:
a non-transitory tangible computer-readable storage medium; and
a plurality of programming instructions stored in the non-transitory tangible computer-readable storage medium, and configured to enable an apparatus, in response to execution of the instructions by the apparatus, to perform operations including:
receiving a first video frame of a plurality of video frames generated from a video stream, wherein said receiving comprises receiving encoded low-frequency coefficients and encoded high-frequency coefficients of color format components of a plurality of levels of wavelet transformation of the first video frame, wherein some non-zero high-frequency coefficients have been encoded as zeros;
decoding the encoded low-frequency coefficients and the encoded high-frequency coefficients;
enhancing selected ones of the decoded high-frequency coefficients; and
performing a plurality of levels of corresponding inverse wavelet transformation, employing the decoded low-frequency coefficients and the enhanced selected ones of the decoded high-frequency coefficients, to recover the color format components of the first video frame.

19. The article of claim 18, wherein the operations further comprise generating an expanded version of the first video frame by considering the first video frame as low-frequency components of the expanded version of the first video frame after one wavelet transformation, and estimating high-frequency components of the expanded version of the first video frame after one wavelet transformation based on the low-frequency components.

* * * * *

UNITED STATES PATENT AND TRADEMARK OFFICE
CERTIFICATE OF CORRECTION

PATENT NO. : 8,068,683 B2  
APPLICATION NO. : 12/615927  
DATED : November 29, 2011  
INVENTOR(S) : DeCegama Page 1 of 1

It is certified that error appears in the above-identified patent and that said Letters Patent is hereby corrected as shown below:

Page 2, item (56), under "Other Publications", in Column 1, Line 7, delete "Jan. 1, 2006," and insert -- Jan. 6, 2009, --.

Page 2, item (56), under "Other Publications", in Column 1, Line 18, delete "Procesxsing," and insert -- Processing, --.

Page 2, item (56), under "Other Publications", in Column 2, Line 44, delete "Switzarland," and insert -- Switzerland, --.

Column 1, Line 8, delete "Real Software" and insert -- Real-Time Software --.

Column 1, Line 9, delete "Content, Protection" and insert -- Content Protection --.

Signed and Sealed this  
Twelfth Day of June, 2012

David J. Kappos  
*Director of the United States Patent and Trademark Office*